US009301260B2

(12) United States Patent
Goto et al.

(10) Patent No.: US 9,301,260 B2
(45) Date of Patent: Mar. 29, 2016

(54) WIRELESS COMMUNICATION SYSTEM, COMMUNICATION CONTROL APPARATUS, COMMUNICATION TERMINAL APPARATUS, AND CONTROL PROGRAM OF COMMUNICATION CONTROL APPARATUS

(75) Inventors: Jungo Goto, Osaka (JP); Yasuhiro Hamaguchi, Osaka (JP); Kazunari Yokomakura, Osaka (JP); Osamu Nakamura, Osaka (JP); Hiroki Takahashi, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 290 days.

(21) Appl. No.: 13/496,809

(22) PCT Filed: Aug. 20, 2010

(86) PCT No.: PCT/JP2010/064083
§ 371 (c)(1),
(2), (4) Date: May 15, 2012

(87) PCT Pub. No.: WO2011/033904
PCT Pub. Date: Mar. 24, 2011

(65) Prior Publication Data
US 2012/0218961 A1    Aug. 30, 2012

(30) Foreign Application Priority Data

Sep. 18, 2009 (JP) .................................. 2009-217002

(51) Int. Cl.
| | |
|---|---|
| *G08C 17/00* | (2006.01) |
| *H04W 52/14* | (2009.01) |
| *H04W 52/24* | (2009.01) |
| *H04W 52/26* | (2009.01) |
| *H04W 72/04* | (2009.01) |
| *H04B 17/382* | (2015.01) |

(52) U.S. Cl.
CPC .......... *H04W 52/146* (2013.01); *H04W 52/247* (2013.01); *H04W 52/26* (2013.01); *H04B 17/382* (2015.01); *H04W 72/0453* (2013.01)

(58) Field of Classification Search
CPC . H04W 52/146; H04W 52/247; H04W 52/26; H04W 72/0453; H04B 17/382
USPC .................................... 370/311, 329, 22–238
See application file for complete search history.

(56) References Cited

U.S. PATENT DOCUMENTS

| | | | |
|---|---|---|---|
| 7,454,175 B2 * | 11/2008 | Karabinis | ........................ 455/73 |
| 8,180,335 B2 * | 5/2012 | Kitazoe et al. | ................ 455/418 |
| 8,446,849 B2 * | 5/2013 | Damnjanovic | ................ 370/311 |
| 8,538,443 B2 * | 9/2013 | Vrzic et al. | .................... 455/447 |
| 2007/0026865 A1 * | 2/2007 | Yano et al. | ..................... 455/438 |
| 2009/0034438 A1 * | 2/2009 | Soulie et al. | ................... 370/280 |
| 2009/0181661 A1 * | 7/2009 | Kitazoe et al. | ................ 455/418 |
| 2009/0203377 A1 * | 8/2009 | Kawasaki | ................... 455/435.1 |
| 2009/0253461 A1 * | 10/2009 | Kuwahara | ..................... 455/561 |
| 2010/0150085 A1 * | 6/2010 | Ishii et al. | ...................... 370/329 |
| 2010/0190506 A1 * | 7/2010 | To et al. | ...................... 455/452.1 |

FOREIGN PATENT DOCUMENTS

| | | |
|---|---|---|
| JP | 2002-204178 A | 7/2002 |
| JP | 2008-118580 A | 5/2008 |
| JP | 2009-060638 A | 3/2009 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213, V8.7.0, pp. 1-77, (May 2009).
Motorola, "Approaches to Assess Uplink Transmission Enhancements for LTE-Advanced", 3GPP TSG-RAN WG1 #54 R1-083226, pp. 1-6, Aug. 18-22, 2008.
Motorola, "Non-contiguous Resource Allocation in Uplink LTE-A", 3GPP TSG RAN1 #55bis R1-090266, Jan. 12-16, 2009.
Sharp, "Remaining Issues on the Uplink Transmission Scheme", 3GPP TSG-RAN WG1#55bis, Ljubljana, Slovenia, Jan. 12-16, 2009, R1-090021, 5 pages.

* cited by examiner

*Primary Examiner* — Phuc Tran
(74) *Attorney, Agent, or Firm* — Birch, Stewart, Kolasch & Birch, LLP

(57) ABSTRACT

To perform control so as to achieve a transmission power that satisfies a desired communication quality by an access method which a mobile station apparatus uses, in consideration of the frequency-selective diversity effect, when switching an access method to the one having a different frequency-selective diversity effect. In a wireless communication system in which a communication control apparatus and a communication terminal apparatus that are able to use a plurality of types of access methods perform wireless communication using any of the access methods, the communication control apparatus, when the necessity of changing the access method arises, determines the access method after change and notifies the communication terminal apparatus of switching the access method before change to the determined access method, and performs the transmission power control in accordance with communication characteristics of the determined access method.

5 Claims, 10 Drawing Sheets

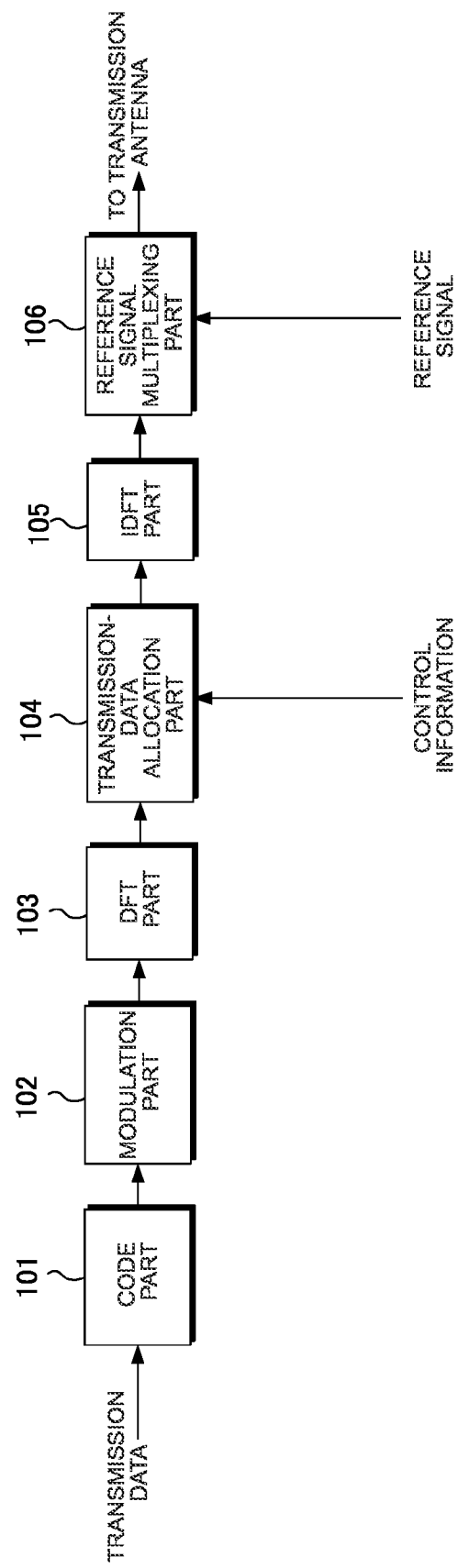

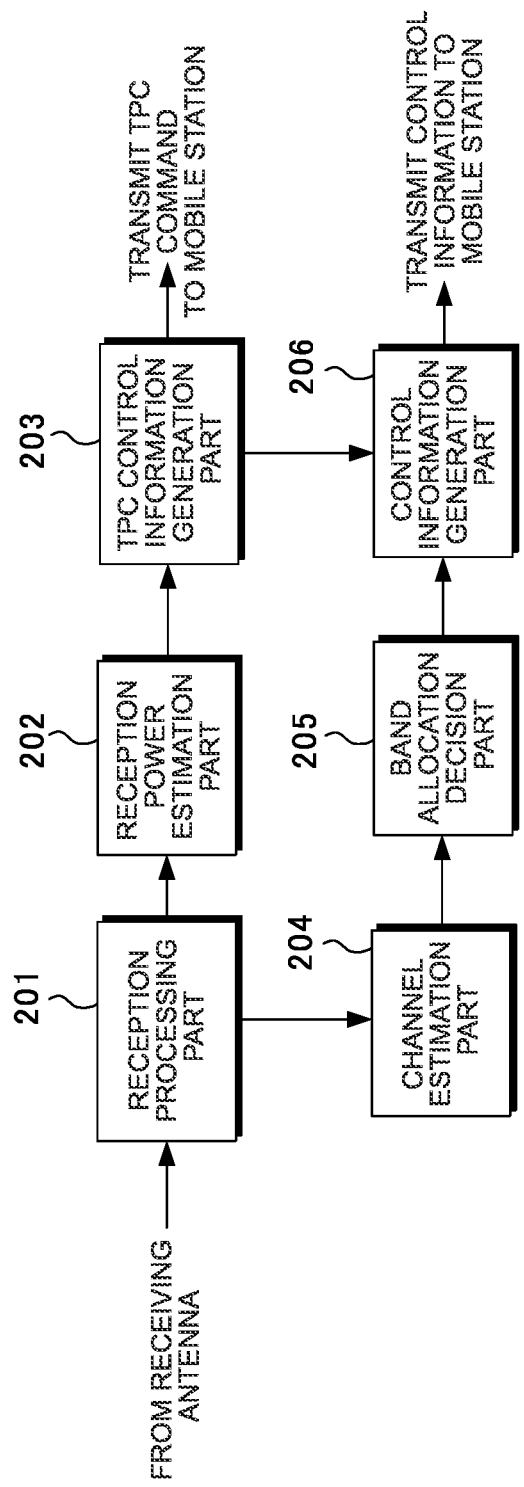

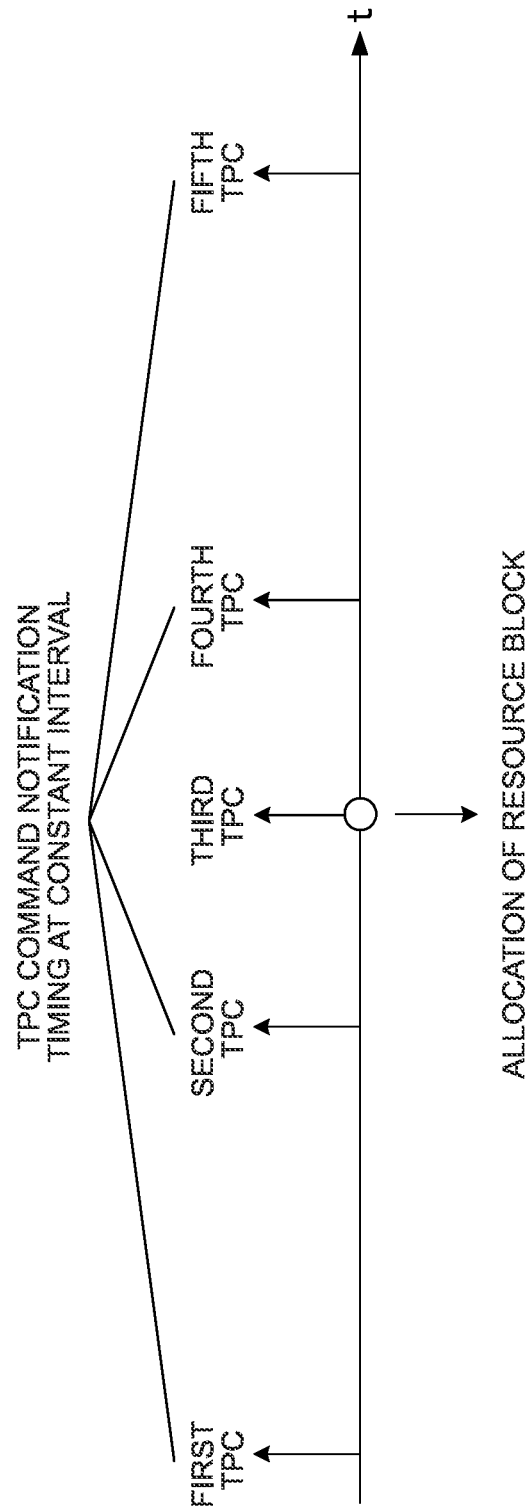

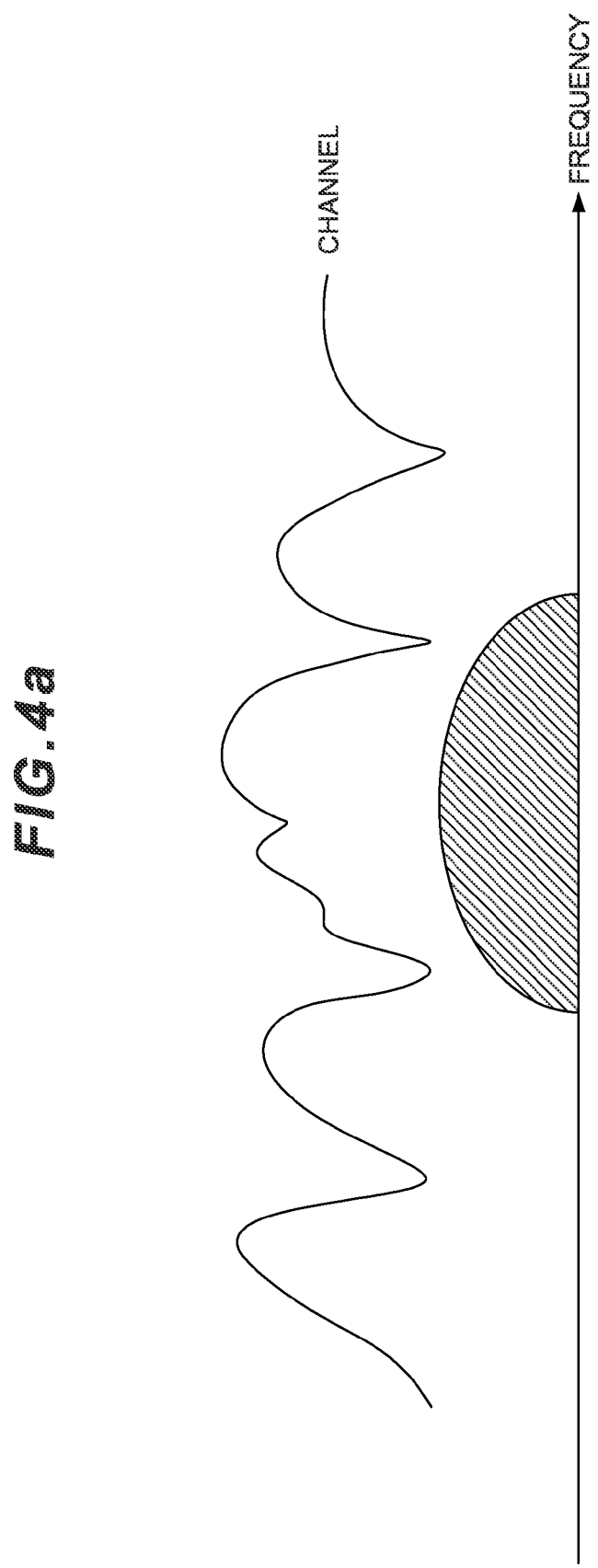

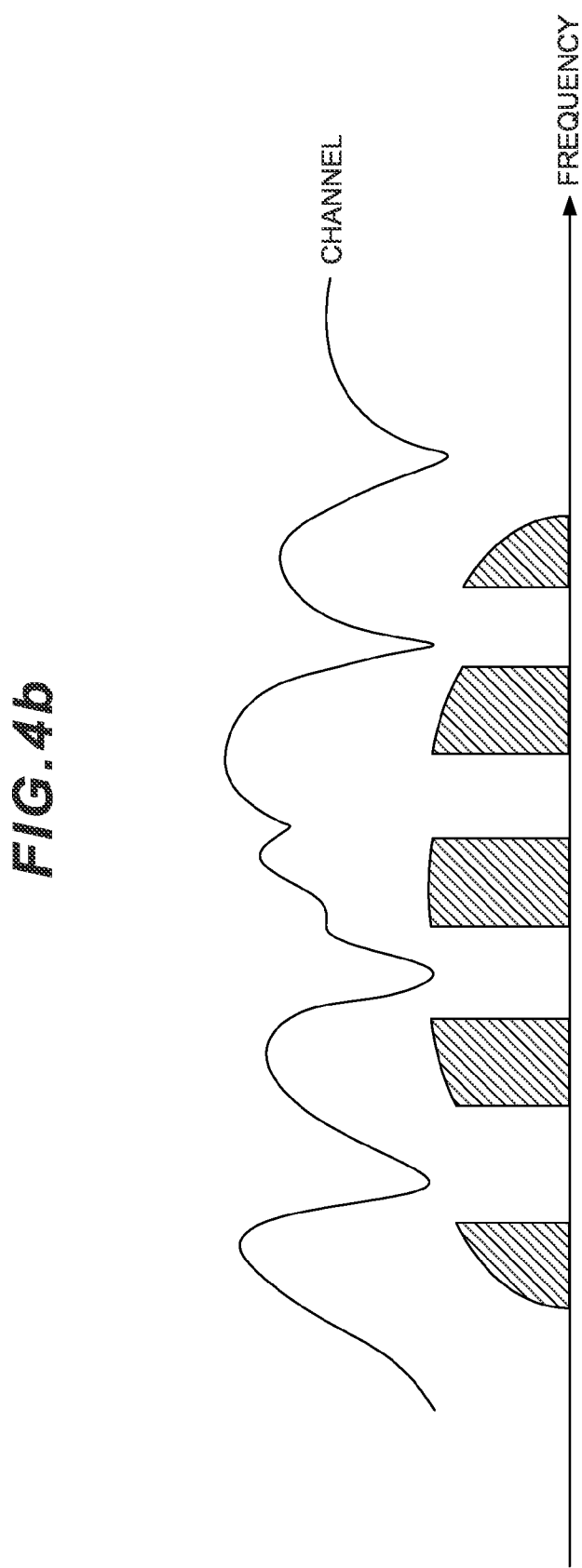

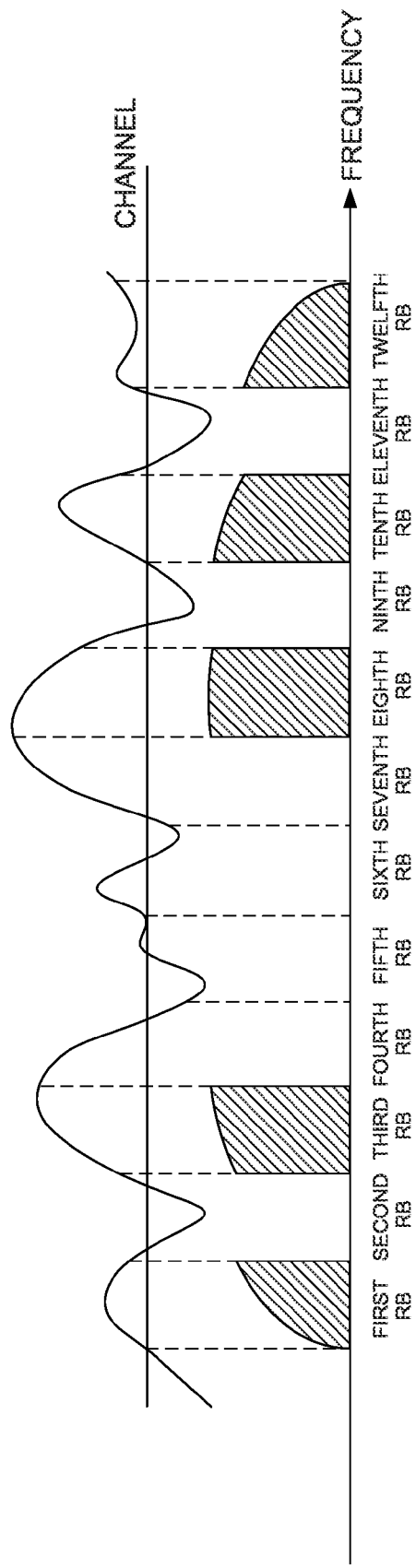

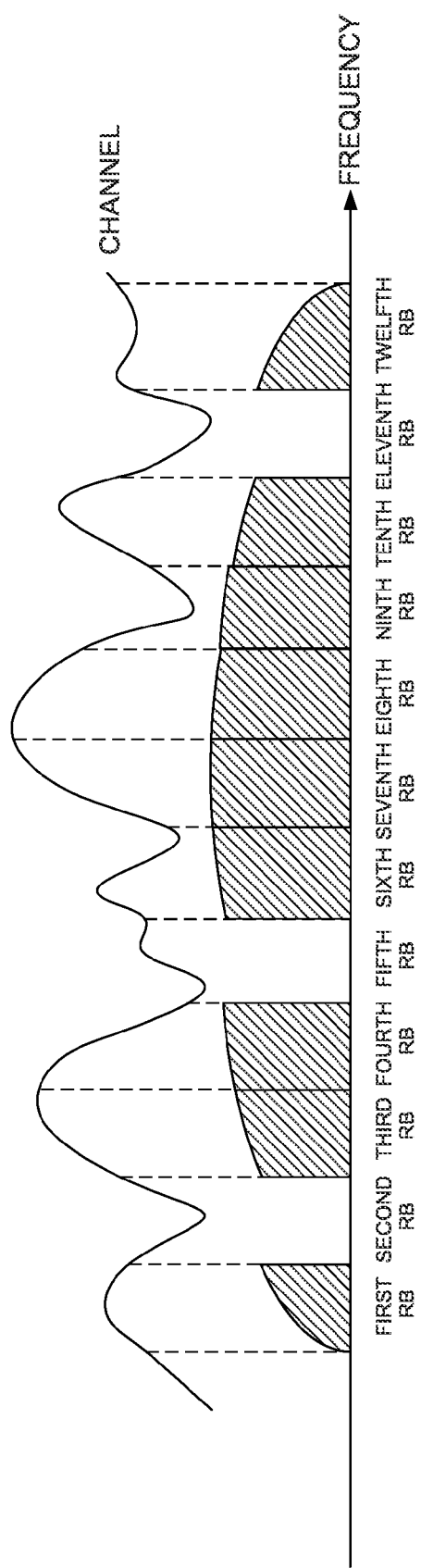

WIRELESS COMMUNICATION SYSTEM, COMMUNICATION CONTROL APPARATUS, COMMUNICATION TERMINAL APPARATUS, AND CONTROL PROGRAM OF COMMUNICATION CONTROL APPARATUS

TECHNICAL FIELD

The present invention relates to a wireless communication system, a communication control apparatus, a communication terminal apparatus, and a control program of the communication control apparatus that perform transmission power control in wireless communication.

BACKGROUND ART

In an uplink (communication to a base station apparatus from a mobile station apparatus) of LTE (Long Term Evolution) which is a wireless communication system of the 3.9th generation mobile phone, it has become possible that a plurality of mobile station apparatuses in a cellular transmits data to the base station apparatus simultaneously by frequency division multiple access (FDMA). In the base station apparatus, since it is necessary to receive the data transmitted simultaneously from the plurality of the mobile station apparatuses, transmission power control (TPC:Transmit Power Control) that makes the reception processing easier by making equal a reception power from each mobile station apparatus has been used. The transmission power control is also used for the purpose of controlling interference to an adjacent base station apparatus. (Non-patent document 1)

In the TPC of the LTE system, there exist an open loop TPC determined in the mobile station apparatus and a closed loop TPC controlled from the base station apparatus. In the open loop TPC, there is a path loss which the mobile station apparatus calculates from the transmission power of a known signal transmitted from the base station apparatus and an actually received power. On the other hand, in the closed loop TPC, excess or deficiency of the power received in the base station apparatus is notified of to the mobile station apparatus. A timing at which the TPC information is notified of to the mobile station apparatus is notified of periodically as control information, and at the same time, is added to the control information allocating a band to be used for the uplink to the mobile station apparatus, and is notified of thereto.

Meanwhile, these days, standardization of LTE-A (it is also called LTE-Advanced, IMT-A, etc.) that is the fourth generation wireless communication system with the LTE system developed further has been carried out. In the uplink of the LTE-A system, DFT-S-OFDM (a dynamic spectrum control (DSC: Dynamic Spectrum Control), also called DFT-S-OFDM with SDC (Spectrum Division Control)) is supported because backward compatibility is considered important, and moreover Clustered DFT-S-OFDM (a dynamic spectrum control (DSC: Dynamic Spectrum Control), also called DFT-S-OFDM with SDC (Spectrum Division Control)) in which backward compatibility with the LTE is considered important, DFT-S-OFDM (Discrete Fourier Transform Spread Orthogonal Frequency Division Multiplexing, also called SC-FDMA), which can improve throughput, is also supported.

The clustered DFT-S-OFDM is capable of acquiring frequency-selective diversity effect because a frequency at which a channel gain is high is selected from a usable band, and the spectrum is allocated discretely. When the spectrum is allocated discretely, the allocation by integral multiple of a resource block (Resource Block) with twelve subcarriers grouped becomes possible, and a cluster with the spectrum divided is allocated. The fewer the number of resource blocks constituting the cluster is, the higher the frequency-selective diversity effect becomes.

PRIOR ART REFERENCE

Non-Patent Document

Non-patent document 1: 3GPP TS 36.213 (V8.7.0) "Evolved Universal Terrestrial Radio Access (E-UTRA) Physical layer procedures"

DISCLOSURE OF THE INVENTION

Problems to be Solved by the Invention

However, the clustered DFT-S-OFDM is capable of securing desired communication quality even if transmission is carried out with small power because the frequency-selective diversity effect is acquired more than the DFT-S-OFDM. Therefore, in the case of switching between the clustered DFT-S-OFDM which is currently investigated in the LTE-A system and the DFT-S-OFDM, if the TPC in which the frequency-selective diversity effect of the LTE system is not taken into consideration is applied as it is, the problems for that a reception power needed in the base station apparatus at the time of switching of the access method is not acquired and that the mobile station apparatus uses unnecessarily high power are caused.

The present invention is accomplished in view of such a situation, and has an object to provide a wireless communication system, a communication control apparatus, a communication terminal apparatus, and a control program of the communication control apparatus, which perform control so as to achieve a transmission power that satisfies a desired communication quality by an access method which a mobile station apparatus uses, in consideration of the frequency-selective diversity effect, when switching an access method to the one having a different frequency-selective diversity effect.

Means for Solving the Problem (1) In order to achieve above-mentioned object, the present invention has taken the following measures. That is, the wireless communication system of the present invention is a wireless communication system in which a communication control apparatus and a communication terminal apparatus that are able to use a plurality of types of access methods perform wireless communication using any of the access methods, wherein the communication control apparatus, when the necessity of changing the access method arises, determines the access method after change and notifies the communication terminal apparatus of switching the access method before change to the determined access method, and performs transmission power control in accordance with communication characteristics of the determined access method.

As described above, since the communication control apparatus performs the transmission power control according to communication characteristics of the determined access method, it can be avoided that the transmission power is lacking, or the data transmission is carried out with a transmission power more than necessary, at the time of switching of the access method or the like.

(2) In the wireless communication system of the present invention, the plurality of types of access methods includes a first access method that allocates frequency domain signals to contiguous frequency bands, and a second access method that allocates frequency domain signals to discrete frequency bands, and wherein the communication control apparatus, in the second access method, changes a control amount of the transmission power by a control signal notified of to the communication terminal apparatus in accordance with a frequency bandwidth allocated discretely.

As described above, since the communication control apparatus, in the second access method changes the control amount of the transmission power by the control signal notified of to the communication terminal apparatus in accordance with the frequency bandwidth allocated discretely, the frequency-selective diversity effect can be reflected to the closed loop TPC when switching the access method. In addition, without increasing the number of times of the TPC notification, even if the switching of the access method, or the number of resource blocks constituting the cluster and the number of divisions of the spectrum are changed, the appropriate transmission power control is made possible.

(3) In the wireless communication system of the present invention, the plurality of types of access methods includes a first access method that allocates frequency domain signals to contiguous frequency bands, and a second access method that allocates frequency domain signals to discrete frequency bands, and wherein the communication terminal apparatus has a function to determine a transmission power using a calculation method of a transmission power determined in advance for every communication terminal apparatus, and in the second access method, changes a calculation method of a transmission power in accordance with a frequency bandwidth allocated discretely.

As described above, since the communication control apparatus, in the second access method can change the calculation method of, for example, an open loop TPC in accordance with the frequency bandwidth allocated discretely, in the case of switching the access method, the frequency-selective diversity effect can be reflected to the open loop TPC. In addition, without increasing the number of times of the TPC notification, even if the switching of the access method, or the number of resource blocks constituting the cluster and the number of divisions of the spectrum are changed, the appropriate transmission power control is made possible.

(4) In the wireless communication system of the present invention, in the frequency bandwidth allocated discretely, the transmission power control is performed in accordance with the narrowest bandwidth.

In the case of allocating the frequency domain signals to the discrete frequency band, since there is correlation with a channel of an adjacent frequency band, there exists a case where the signal divided in the frequency domain may be allocated to the adjacent frequency band, and the frequency bandwidth allocated discretely may not be constant. In this way, even when the frequency bandwidth allocated discretely differs, since the frequency-selective diversity effect is determined by the bandwidth of the signal divided in the frequency domain, the frequency diversity effect can be reflected with channel quality maintained by performing the transmission power control in accordance with the narrowest bandwidth.

(5) In the wireless communication system of the present invention, in the second access method, the transmission power control is performed in accordance with the number of divisions of the spectrum in the case of allocating the frequency domain signals to the discrete frequency bands.

As described above, since, in the second access method, the transmission power control is performed in accordance with the number of divisions of the spectrum in the case of allocating the frequency domain signals to the discrete frequency bands, the transmission power control in consideration of increase of a peak power caused by increase in the number of divisions of the cluster becomes possible, and the frequency diversity effect can be reflected with channel quality maintained.

(6) In the wireless communication system of the present invention, transmission power control is performed in accordance with a moving speed of the communication terminal apparatus.

As described above, since the transmission power control is performed in accordance with the moving speed of the communication terminal apparatus, even when the mobile station apparatus is moving in a high speed, the frequency-selective diversity effect in consideration of influence due to time variation of the channel can be reflected.

(7) In the wireless communication system of the present invention, the communication control apparatus performs the transmission power control in accordance with a required time until the communication terminal apparatus starts transmission of data after transmitting a known signal used for channel estimation.

As described above, since the communication control apparatus performs the transmission power control in accordance with the required time until the communication terminal apparatus starts transmission of data after transmitting the known signal used for channel estimation, the frequency-selective diversity effect in consideration of the influence due to the time variation of the channel depending on the time length until the communication terminal apparatus carries out data transmission after transmitting an SRS (Sounding Reference Signal) that is a reference signal for the channel estimation, can be reflected.

(8) In the wireless communication system of the present invention, the communication control apparatus performs the transmission power control in accordance with the frequency bandwidth which the communication terminal apparatus uses and the frequency bandwidth which the communication control apparatus can allocate.

As described above, since the communication control apparatus performs the transmission power control in accordance with the frequency bandwidth which the communication terminal apparatus uses and the frequency bandwidth which the communication control apparatus can allocate, also in consideration of the case where the number of resource blocks which the communication terminal apparatus uses increases against the number of resource blocks which the communication control apparatus can allocate, and the case where the allocation to the resource block with the channel deteriorated is necessary, the communication control apparatus can reflect to the transmission power control the gain to which reflected is also a portion corresponding to deterioration of the frequency-selective diversity effect.

(9) In the wireless communication system of the present invention, the communication control apparatus, when the communication terminal apparatus carries out transmission diversity, performs the transmission power control in accordance with the number of transmission antennas which the communication terminal apparatus uses.

As described above, since the communication control apparatus, when the communication terminal apparatus carries out the transmission diversity, performs the transmission power control in accordance with the number of transmission antennas which the communication terminal apparatus uses, the transmission power control in consideration of deterioration of the frequency-selective diversity effect due to the application of the transmission diversity can be carried out.

(10) In the wireless communication system of the present invention, the communication control apparatus, when the communication terminal apparatus carries out MIMO (Multiple-Input Multiple-Output), performs the transmission power control in accordance with the number of transmission antennas which the communication terminal apparatus uses.

As described above, since the communication control apparatus, when the communication terminal apparatus carries out the MIMO (Multiple-Input Multiple-Output), performs the transmission power control in accordance with the number of transmission antennas which the communication terminal apparatus uses, the transmission power control in consideration of deterioration of the frequency-selective diversity effect due to the application of the MIMO can be carried out.

(11) In the wireless communication system of the present invention, the communication control apparatus, when the communication terminal apparatus carries out the MIMO, performs the transmission power control in accordance with the number of receiving antennas to be used.

As described above, since the communication control apparatus, when the communication terminal apparatus carries out the MIMO, performs the transmission power control in accordance with the number of receiving antennas to be used, the transmission power control in consideration of deterioration of the frequency-selective diversity effect due to the application of the MIMO can be carried out.

(12) The communication control apparatus of the present invention is a communication control apparatus applied to a wireless communication system in which a communication control apparatus and a communication terminal apparatus that are able to use a plurality of types of access methods perform wireless communication using any of the access methods, wherein the communication control apparatus, when the necessity of changing the access method arises, determines the access method after change and notifies the communication terminal apparatus of switching the access method before change to the determined access method, and performs transmission power control in accordance with communication characteristics of the determined access method.

As described above, since the communication control apparatus performs the transmission power control according to communication characteristics of the determined access method, it can be avoided that the communication terminal apparatus performs data transmission with deficiency in the transmission power or with the transmission power more than necessary at the time of switching of the access method or the like.

(13) In the communication control apparatus of the present invention, the plurality of types of access methods includes a first access method that allocates frequency domain signals to contiguous frequency bands, and a second access method that allocates frequency domain signals to discrete frequency bands, and in the second access method, in accordance with a frequency bandwidth allocated discretely, a control amount of the transmission power is changed by a control signal and is notified of.

As described above, since the communication control apparatus, in the second access method, changes the control amount of the transmission power by the control signal in accordance with the frequency bandwidth allocated discretely and carries out notification thereof, the frequency-selective diversity effect can be reflected to the closed loop TPC when switching the access method. In addition, without increasing the number of times of the TPC notification, even if the switching of the access method, or the number of resource blocks constituting the cluster and the number of divisions of the spectrum are changed, the appropriate transmission power control is made possible.

(14) The communication terminal apparatus of the present invention is a communication terminal apparatus applied to a wireless communication system in which a communication control apparatus and a communication terminal apparatus that are able to use a plurality of types of access methods perform wireless communication using any of the access methods, wherein, the plurality of types of access methods includes a first access method that allocates frequency domain signals to contiguous frequency bands and a second access method that allocates frequency domain signals to discrete frequency bands, and the communication terminal apparatus has a function to determine a transmission power using a calculation method of a transmission power determined in advance for every communication terminal apparatus, and in the second access method, changes a calculation method of a transmission power in accordance with a frequency bandwidth allocated discretely.

As described above, since the communication terminal apparatus, in the second access method, changes the calculation method of the transmission power in accordance with the frequency bandwidth allocated discretely, in the case of switching the access method, the frequency-selective diversity effect can be reflected to the open loop TPC. In addition, without increasing the number of times of the TPC notification, even if the switching of the access method, or the number of resource blocks constituting the cluster and the number of divisions of the spectrum are changed, the appropriate transmission power control is made possible.

(15) The control program of a communication control apparatus of the present invention is a control program of a communication control apparatus applied to a wireless communication system in which a communication control apparatus and a communication terminal apparatus that are able to use a plurality of types of access methods perform wireless communication using any of the access methods, the control program converting a series of processing into computer-readable and computer-executable commands, the series of processing comprising: judging whether the necessity of changing an access method arises; determining, when the necessity of changing an access method arises as a result of the judgment, an access method after change; notifying the communication terminal apparatus of switching an access method before change to the determined access method; and performing transmission power control in accordance with communication characteristics of the determined access method.

As described above, since the communication control apparatus performs the transmission power control in accordance with communication characteristics of the determined access method, it can be avoided that the transmission power is lacking, or the data transmission is carried out with a transmission power more than necessary, at the time of switching of the access method or the like.

Effect of the Invention

The application of the present invention makes it possible to suppress that the mobile station apparatus uses a transmission power more than necessary, or an error rate increases due to the lack of the transmission power, even when switching an access method, and further makes it possible to realize TPC in consideration of the frequency-selective diversity without increasing the number of times of notification of the TPC command from that in a conventional LTE system.

BRIEF DESCRIPTION OF THE DRAWINGS

FIG. 1 a block diagram illustrating an example of a mobile station apparatus (communication terminal apparatus) that is a transmission apparatus according to an embodiment of the present invention;

FIG. 2 illustrates a simple block diagram of a base station apparatus according to an embodiment of the present invention;

FIG. 3 illustrates a timing at which the TPC is notified of in a conventional LTE system;

FIG. 4a is a figure illustrating allocation of a resource block in the case of using an access method of DFT-S-OFDM in an embodiment of the present invention;

FIG. 4b is a figure illustrating allocation of resource blocks in the case of using an access method of Clustered DFT-S-OFDM in an embodiment of the present invention;

FIG. 5a illustrates, in a third embodiment of the present invention, the case where resource blocks which the base station apparatus can allocate are a first RB to a twelfth RB, and the number of the resource blocks is set as 12, and the number of resource blocks which the mobile station apparatus uses is 5;

FIG. 5b illustrates, in a third embodiment of the present invention, the case where resource blocks which the base station apparatus can allocate are the first RB to the twelfth RB, and the number of the resource blocks is set as 12, and the number of resource blocks which the mobile station apparatus uses is 9;

BEST MODES FOR CARRYING OUT THE INVENTION

Figure 6:
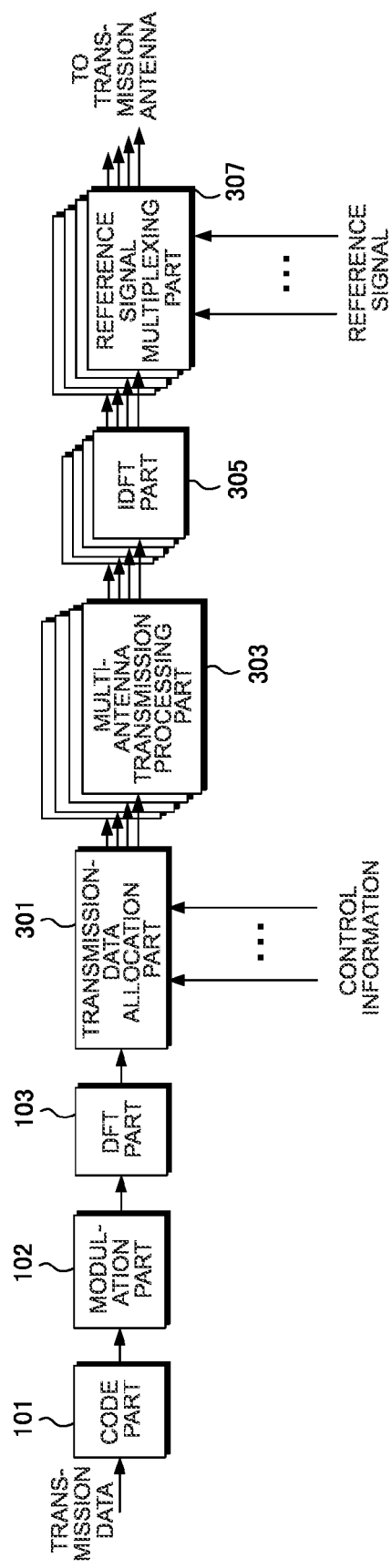
FIG. 6 is a block diagram illustrating an example of a mobile station apparatus that is a transmission apparatus according to a forth embodiment of the present invention (applying transmission diversity)

Hereinafter, embodiments of the present invention will be described with reference to drawings. In following embodiments, an access method in which a frequency-selective diversity effect is acquired is made to be the Clustered DFT-S-OFDM. However, even the OFDM that is multi-carrier transmission capable of using a band discretely is regarded as the same as the present invention if the transmission power control method is essentially the same. In the present embodiment, a communication terminal apparatus will be described as a mobile station apparatus, and a communication control apparatus will be described as a base station apparatus.

FIG. 1 is a block diagram illustrating an example of a mobile station apparatus (communication terminal apparatus) that is a transmission apparatus according to an embodiment of the present invention. In FIG. 1, it is illustrated as the minimum block diagram necessary to describe the present invention. In the mobile station apparatus, transmission data are input into a code part 101, and an error correcting code is applied. A code bit is modulated into modulation symbols, such as QPSK (Quaternary Phase Shift Keying; four phases phase shift modulation) and 16QAM (16 Quadrature Amplitude Modulation; 16 quadrature amplitude modulation) in a modulation part 102, and is converted into frequency domain signals in a DFT part 103. In a transmission-data arrangement part 104, a frequency signal is allocated based on band allocation information indicated in the control information notified of from the base station apparatus (communication control apparatus). When the band allocated by the control information is a contiguous band, the DFT-S-OFDM will be used, and in the case of a discrete band, the access method of the Clustered DFT-S-OFDM will be used. The signal output from the transmission-data arrangement part 104 is converted into a time domain signal by an IDFT part 105, and a reference signal is multiplexed in a reference signal multiplexing part 106, and is transmitted from a transmission antenna.

FIG. 2 illustrates a simple block diagram of a base station apparatus according to an embodiment of the present invention. In the base station apparatus, a signal transmitted from a mobile station apparatus is received by a receiving antenna and is input into a reception processing part 201. The signal acquired by the reception processing is input into a reception power estimation part 202 and a channel estimation part 204. In a reception power estimation part 202, a reception power is estimated, and the TPC which is notified of to the mobile station apparatus is determined. In a TPC control information generation part 203, control information of the TPC determined by the reception power estimation part 202 is generated. On the other hand, in the channel estimation part 204, a channel is estimated with a known reference signal acquired by the reception processing, and channel state information is input into a band allocation decision part 205. The determined band allocation information based on the channel state information in the band allocation decision part 205 is input into a control information generation part 206. In the control information generation part 206, control information notified of to the mobile station apparatus is generated from the band allocation information and the TPC control information, and is transmitted from an antenna. When there is no band allocation information so as to transmit the TPC periodically, only the control information of the TPC control information generation part 203 is transmitted from the antenna.

FIG. 3 illustrates a timing at which the TPC is notified of in a conventional LTE system. In this figure, a horizontal axis is made to be time and a first TPC to a fifth TPC indicate timing at which the TPC is notified of to the mobile station apparatus. As for the TPC notified of to the mobile station apparatus, there exist what is notified of periodically like a first, second, fourth, and fifth TPC, and what is notified of at the same time as the allocation of a resource block like a third TPC. The TPC notified of at such timing is reflected in a transmission power as a closed loop TPC.

Next, a transmission power of the mobile station apparatus in the LTE system is indicated in a formula (1).
[Formula 1]

$$\text{The transmission power of the mobile station apparatus} = \text{Min}\ \{P_{MAX}, TX_{OP} + TX_{CL}\} \quad (1)$$

In the formula (1), a $TX_{OP}$ is an open loop TPC which is determined by the mobile station apparatus, and a $TX_{CL}$ is a closed loop TPC notified of in the timing shown in FIG. 3. Min indicates that a small value inside { } shall be chosen.

As a method by which notification is carried out by the closed loop TPC, there are two kinds of methods by which a difference against the $TX_{CL}$ is notified of and a difference against the transmission power of the mobile station apparatus is notified of. When the difference against the $TX_{CL}$ is notified of, a value notified of by the TPC is accumulated. For example, when the notification: $T_0$ (dB), $T_1$ (dB), ..., $T_n$ (dB) are received by the TPC in the case of $TX_{CL}$=T before the notification of the TPC, the $TX_{CL}$ is accumulated as shown in a formula (2).

[Formula 2]

$$TX_{CL} = T + \sum_{i=0}^{n} Ti \quad (2)$$

The TPC in the LTE system in this case is notified of by 2-bits control information, and a value which increases and decreases the transmission power of four types will exist. This control information, and the increase and decrease of the transmission power are determined as shown in a Table 1.

TABLE 1

| TPC CONTROL BIT | TRANSMISSION POWER CONTROL |
|---|---|
| 00 | −1 (dB) |
| 01 | 0 (dB) |
| 10 | 1 (dB) |
| 11 | 3 (dB) |

When the difference against the transmission power of the mobile station apparatus is notified of as the TPC, the $TX_{CL}$ is determined so as to be a value reflecting the difference of the TPC notified of from the transmission power of the mobile station apparatus. For example, when a $TX_{POWER}$ that is the transmission power of the mobile station apparatus is determined by the formula (1), the $TX_{CL}$ which fulfills a formula (3) is applied when notification of $T_1$ (dB) is received by the TPC.

[Formula 3]

$$TX_{POWER} + T_1 = \text{Min}\{P_{MAX}, TX_{OP} + TX_{CL}\} \quad (3)$$

Also the TPC in the LTE system in this case is notified of by 2-bits control information, which is determined as shown in a Table 2.

TABLE 2

| TPC CONTROL BIT | TRANSMISSION POWER CONTROL |
|---|---|
| 00 | −4 (dB) |
| 01 | −1 (dB) |
| 10 | 1 (dB) |
| 11 | 4 (dB) |

First Embodiment

In the present embodiment, an example of the TPC in which the frequency-selective diversity effect is reflected to the closed loop TPC in the case of switching the access method will be described.

FIG. 4a is a figure illustrating allocation of a resource block in the case of using the access method of DFT-S-OFDM in the embodiment of the present invention. Since the resource block is allocated contiguously, an inter-symbol interference arises and characteristics deteriorate because the resource block with the channel deteriorated is also used.

FIG. 4b is a figure illustrating allocation of resource blocks in the case of using the access method of Clustered DFT-S-OFDM in the embodiment of the present invention. Because of allocating a divided spectrum by selecting only the good resource block with the channel being good, an influence of the ISI (inter-symbol interference) is decreased, and good characteristics are acquired. Since the more the number of divisions of the cluster increases, the more a peak power increases in this access method, the DFT-S-OFDM is suitable when a high transmission power is needed in a cell edge etc. Therefore, in the LTE-A system, it is assumed that the DFT-S-OFDM and the Clustered DFT-S-OFDM are switched to be used depending on a channel or moving speed or position in the cell of the mobile station apparatus. Moreover, in the Clustered DFT-S-OFDM, it is considered that a cluster size or the number of divisions of the spectrum, etc. is controlled dynamically. The cluster size and the frequency-selective diversity effect of the Clustered DFT-S-OFDM are shown in a Table 3.

TABLE 3

| NUMBER OF RESOURCE BLOCK OF CLUSTER | FREQUENCY-SELECTIVE DIVERSITY |
|---|---|
| 1 | $X_1$ (dB) |
| 2 | $X_2$ (dB) |
| 3 | $X_3$ (dB) |
| 4 | $X_4$ (dB) |
| $N_{CSEDRB}$ | 0 (dB) |

Where, when a $N_{USEDRB}$ is made to be the number of resource blocks which the mobile station apparatus uses for data transmission, and the number of resource blocks constituting a cluster is $N_{USEDRB}$, it means carrying out the data transmission by means of the DFT-S-OFDM since the spectrum is not divided. Since the fewer are the numbers of resource blocks constituting the cluster, the more the frequency-selective diversity effect is acquired, and with the smaller transmission power, the better communication quality is acquired, a relation of $X_1 > X_2 > X_3 > X_4$ is realized. Although a description for the present example is given by the number of resource blocks constituting the cluster in the Table 3, the frequency-selective diversity effect may be shown by the number of divisions of the spectrum.

When switching in which the frequency-selective diversity effect changes based on the notification of the resource block allocation is performed, for example, when the resource block in the third TPC of the FIG. 3 is changed into discrete allocation from contiguous allocation or changed into the contiguous allocation from the discrete allocation, or the cluster size is changed, the frequency-selective diversity effect is reflected to the closed loop TPC. In the case of the Table 1 and the Table 2, the control is carried out as shown in a Table 4.

TABLE 4

| TPC CONTROL BIT | TABLE 1 CASE | TABLE 2 CASE |
|---|---|---|
| 00 | $-1 - X_{ij}$ (dB) | $-4 - X_{ij}$ (dB) |
| 01 | $-X_{ij}$ (dB) | $-1 - X_{ij}$ (dB) |
| 10 | $1 - X_{ij}$ (dB) | $1 - X_{ij}$ (dB) |
| 11 | $3 - X_{ij}$ (dB) | $4 - X_{ij}$ (dB) |

Where, i is made to be the number of resource blocks constituting the cluster after switching of the access method, and j is made to be the number of resource blocks constituting the cluster before switching of the access method. $X_i$ and $X_j$ are made to be positive values indicating the frequency-selective diversity effect, and $X_{ij}$ is defined by a following formula.

[Formula 4]

$$X_{ij} = X_i - X_j \quad (4)$$

Although the present example is made to be a mode in which a portion corresponding to the frequency-selective diversity effect is reflected to the TPC of the LTE system, the present embodiment can be applied also when the TPC of the DFT-S-OFDM is not the same as the LTE.

When a gain of the channel can be estimated completely, the frequency-selective diversity effect is acquired to the maximum extent. However, when the mobile station apparatus is moving in a high speed, a time variation of the channel becomes large, and the diversity effect is decreased due to an estimation error of the channel. Therefore, the TPC may be performed as shown in a Table 5 also in consideration of the moving speed of the mobile station apparatus.

TABLE 5

| TPC CONTROL BIT | TABLE 1 CASE | TABLE 2 CASE |
|---|---|---|
| 00 | $-1 - X_{ij} + M_{SPEED}$ (dB) | $-4 - X_{ij} + M_{SPEED}$ (dB) |
| 01 | $-X_{ij} + M_{SPEED}$ (dB) | $-1 - X_{ij} + M_{SPEED}$ (dB) |
| 10 | $1 - X_{ij} + M_{SPEED}$ (dB) | $1 - X_{ij} + M_{SPEED}$ (dB) |
| 11 | $3 - X_{ij} + M_{SPEED}$ (dB) | $4 - X_{ij} + M_{SPEED}$ (dB) |

Where, $M_{SPEED}$ is a portion corresponding to deterioration of the frequency-selective diversity effect due to the moving speed of the mobile station apparatus, and is made to be a positive value. In the case of switching to the access method of which the frequency-selective diversity effect is higher, the formula will be: $-X_{ij} + M_{SPEED} <= 0$ and in the case of switching to the access method of which the frequency-selective diversity effect is lower, the formula will be: $-X_{ij} + M_{SPEED} >= 0$.

The channel estimation error due to the time variation of the channel is influenced also by the time length until the mobile station apparatus carries out data transmission after transmitting a SRS (Sounding Reference Signal) that is a reference signal for the channel estimation, besides the moving speed of the mobile station apparatus. Therefore, the TPC of a Table 6 in consideration of an overhead from the channel estimation up to the data transmission may be performed.

TABLE 6

| TPC CONTROL BIT | TABLE 1 CASE | TABLE 2 CASE |
|---|---|---|
| 00 | $-1 - X_{ij} + T_{OH}$ (dB) | $-4 - X_{ij} + T_{OH}$ (dB) |
| 01 | $-X_{ij} + T_{OH}$ (dB) | $-1 - X_{ij} + T_{OH}$ (dB) |
| 10 | $1 - X_{ij} + T_{OH}$ (dB) | $1 - X_{ij} + T_{OH}$ (dB) |
| 11 | $3 - X_{ij} + T_{OH}$ (dB) | $4 - X_{ij} + T_{OH}$ (dB) |

Where, $T_{OH}$ is a portion corresponding to deterioration, of the frequency-selective diversity, due to the moving speed of the mobile station apparatus and the overhead from the channel estimation up to the data transmission, and is made to be a positive value. In the case of switching to the access method of which the frequency-selective diversity effect is higher, the formula will be: $-X_{ij} + T_{OH} <= 0$, and in the case of switching to the access method of which the frequency-selective diversity effect is lower, the formula will be: $-X_{ij} + T_{OH} >= 0$.

In the present embodiment, in the case of carrying out the closed loop TPC notification at the same timing as that of the LTE system, the control information received in the mobile station apparatus is converted to be applied to a value reflecting the frequency-selective diversity effect of the access method used for the data transmission only when switching of the access method occurs. Therefore, without increasing the number of times of the TPC notification, even if the switching of the access method, or the number of resource blocks and number of divisions of the spectrum which constitute the cluster are changed, the appropriate transmission power control is made possible. Therefore, it can be avoided that the transmission power is lacking, or the data transmission is carried out with an excessive transmission power, at the time of switching of the access method or the like.

In the present example, although the number of resource blocks of the cluster is made to be up to 4, even if it is five or more, the frequency-selective diversity effect may be reflected to the TPC similarly. Although the number of resource blocks constituting the cluster is made to be constant in the present embodiment, the embodiment can be applied also to the case where the size differs for every cluster. The frequency-selective diversity effect may be determined from the cluster consisting of the smallest number of resource blocks in the cluster, and the frequency-selective diversity effect may be determined using the value with the number of resource blocks of all the clusters averaged.

Second Embodiment

In the present embodiment, an example of the TPC which reflects the frequency-selective diversity effect to the open loop TPC in the case of switching the access method will be described.

In the $TX_{OP}$ that is the open loop TPC of the formula (1), the number of resource blocks to be used, and the path loss, etc. are included. Furthermore, by adding the frequency-selective diversity effect to the open loop TPC, and performing the TPC of the formula (5), the appropriate power control becomes possible at the time of the switching of the access method.

[Formula 5]

$$\text{The transmission power of the mobile station apparatus} = \text{Min } \{P_{MAX}, TX_{OP} - X_i)TX_{CL}\} \quad (5)$$

Where, i is the number of resource blocks constituting the cluster, and $X_i$ is made to be a positive value indicating the frequency-selective diversity effect. In the case of the DFT-S-OFDM, $X_i$ is made to be zero.

In the formula (5), although the open loop TPC is made to be $(TX_{OP} - X_i)$, it may be made to be the formula (6), reflecting the moving speed of the mobile station apparatus.

[Formula 6]

$$\text{The transmission power of the mobile station apparatus} = \text{Min } \{P_{AX}, TX_{OP} - X_i + M_{SPEED}) + TX_{CL}\} \quad (6)$$

Where, $M_{SPEED}$ is the portion corresponding to deterioration of the frequency-selective diversity effect due to the moving speed of the mobile station apparatus, and is made to be a positive valued. It may be made to be the formula (7) in consideration of the overhead of the channel estimation and the data transmission.

[Formula 7]

$$\text{The transmission power of the mobile station apparatus} = \text{Min } \{P_{MAX}, (TX_{OP} - X_i + T_{OH}) + TX_{CL}\} \quad (7)$$

Where, $T_{OH}$ is a portion corresponding to deterioration, of the frequency-selective diversity, due to the moving speed of the mobile station apparatus and the overhead from the channel estimation up to the data transmission, and is made to be a positive value. In the example of the present embodiment, although the frequency-selective diversity effect is indicated by the cluster size, the frequency-selective diversity effect may be defined by the number of divisions of the spectrum.

In the present embodiment, by reflecting the frequency-selective diversity effect to the open loop TPC, without increasing the number of times of the notification of the TPC more than that of the LTE system, even if the switching of the access method, or the number of resource blocks and number of divisions of the spectrum which constitute the cluster are changed, the appropriate transmission power control is made possible. Therefore, it can be avoided that the transmission power is lacking, or the data transmission is carried out with an excessive transmission power, at the time of switching of the access method or the like.

Third Embodiment

In the present embodiment, described is an example where the frequency-selective diversity effect is not determined only by the number of resource blocks constituting the cluster, and is determined in consideration of also the whole number of resource blocks which the mobile station apparatus uses, and the number of resource blocks which the base station apparatus can allocate.

In the previous embodiment, since the fewer the number of resource blocks constituting the cluster is, the frequency domain signal with the spectrum divided becomes possible to be allocated to the better channel, an example where the frequency-selective diversity effect is determined uniquely by the number of resource blocks constituting the cluster like the Table 3, was described. However, if the number of resource blocks which the mobile station apparatus uses increases against the number of resource blocks which the base station apparatus can allocate, the frequency-selective diversity effect is decreased since the allocation to the resource block with the channel deteriorated is also needed. Therefore, by taking into consideration the number of resource blocks which the base station apparatus can allocate and also the number of resource blocks which the mobile station apparatus uses, a more exact frequency-selective diversity effect can be reflected to the transmission power control.

FIG. 5a illustrates, in a third embodiment of the present invention, the case where resource blocks which the base station apparatus can allocate are a first RB to a twelfth RB, and the number of the resource blocks are set as 12, and the number of resource blocks which the mobile station apparatus uses is 5.

FIG. 5b illustrates, in the third embodiment of the present invention, the case where resource blocks which the base station apparatus can allocate are a first RB to a twelfth RB, and the number of the resource blocks is set as 12, and the number of resource blocks which the mobile station apparatus uses is 9. The FIG. 5a is an example where the resource blocks which the mobile station apparatus uses are few, and therein, a first RB, third RB, eighth RB, tenth RB and twelfth RB of resource blocks in which the channel gain is comparatively high are allocated. In contrast to this, in an example of FIG. 5b where the number of resource blocks which the mobile station apparatus uses is large, since the allocation to a fourth RB, sixth RB and ninth RB etc. with the channel deteriorated is performed, the frequency-selective diversity effect is decreased, and characteristics deteriorate due to the inter-symbol interference.

In order to reflect the frequency-selective diversity effect to the transmission power control more accurately, a formula (8) may be used in which the number of resource blocks which the base station apparatus can allocate and the number of resource blocks which the mobile station apparatus uses are taken into consideration.

[Formula 8]

$$X_{i\_RB} = X_i - N(s,t) \quad (8)$$

Where, $X_i$ is made to be the frequency-selective diversity effect when the number of resource blocks constituting the cluster is made to be i. s is made to be the number of resource blocks which the mobile station apparatus uses, and t is the number of resource blocks which the base station apparatus can allocate, and N (s, t) is made to be a portion corresponding to deterioration of the frequency-selective diversity effect calculated from the bandwidth which the mobile station apparatus uses against a allocatable bandwidth.

By applying $X_{i\_RB}$ of the formula (8) in place of $X_i$ to the closed loop TPC and open loop TPC of the first embodiment and second embodiment, the transmission power control in consideration of the number of resource blocks which the mobile station apparatus uses becomes possible.

By applying the present embodiment, the open loop TPC and closed loop TPC in consideration of the switching of the access method, the number of resource blocks constituting the cluster, the number of divisions of the spectrum and the number of resource blocks which the mobile station apparatus uses, becomes possible. Therefore, it can be avoided that the transmission power is lacking, or the data transmission is carried out with an excessive transmission power, at the time of switching of the access method or the like.

Fourth Embodiment

In the present embodiment, described is an example where, in MIMO (Multiple-Input Multiple-Output), transmission diversity, using a plurality of transmission antennas, the frequency-selective diversity effect is reflected to the transmission power control in the case of switching the access method.

In the mobile station apparatus provided with a plurality of antennas, the transmission diversity in which a transmission signal converted from the same code bit is transmitted using the same frequency by a plurality of antennas and the MIMO in which the transmission signal converted from the different code bit is transmitted using the same frequency by plurality of antennas become applicable. A configuration of the mobile station apparatus provided with a plurality of antennas will be described.

FIG. 6 is a block diagram illustrating an example of the mobile station apparatus that is the transmission apparatus according to the forth embodiment of the present invention (applying transmission diversity). In the case of FIG. 6 where the transmission diversity is applied, the code bit acquired from a code part 101 is modulation-processed by a modulation part 102, and is converted by a DFT into frequency domain signals. When a SFBC (Space Frequency Block Code) and STBC (Space Time Block Code) of the transmission diversity are applied, an encoding is applied to the frequency domain signals, which is performed in multi-antenna transmission processing part 303 in the present figure. In a CDD (Cyclic Delay Diversity), a circulation delay is given to the time domain signal after an IDFT is carried out, which are transmitted from each transmission antenna.

Figure 7:
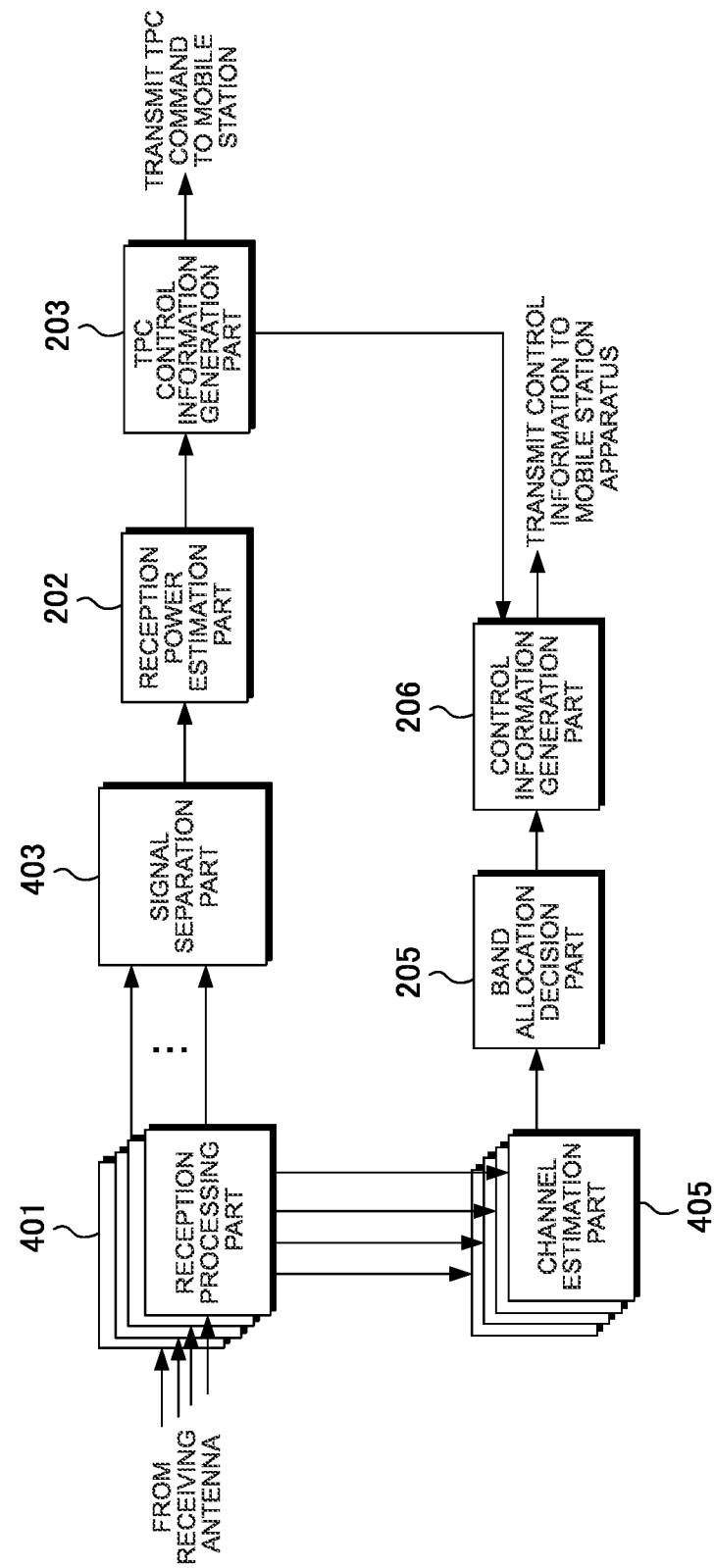
FIG. 7 illustrates a simple block diagram of a base station apparatus according to the forth embodiment of the present invention.

FIG. 7 illustrates a simple block diagram of a base station apparatus according to the forth embodiment of the present invention. In the base station apparatus, signals received by a plurality of receiving antennas like FIG. 2 are input into a reception processing part 401. Synthesizing of the reception signals is performed in the reception processing part 401, and as for the other processing, the same processing as those in the case of one transmission antenna are carried out.

In comparison with the case where the number of the transmission antenna is one, when the transmission diversity is applied, an influence of the channel of which the gain is low can be decreased owing to a transmission diversity gain. Therefore, since the frequency-selective diversity effect at the time of applying the transmission diversity is decreased in comparison to the case where the number of the transmission antenna is one, a formula such as a formula 9 may be used.

[Formula 9]

$$X_{i\_T \times D} = X_i - N_{T \times DANT} \quad (9)$$

Where, $X_i$ is made to be the frequency-selective diversity effect when the number of resource blocks constituting the cluster is made to be i. T×DANT is a number of the antenna of the transmission diversity, and $N_{T \times DANT}$ indicates a portion corresponding to deterioration of the frequency-selective diversity effect due to the number of the transmission antenna. In addition, $X_{i\_T \times D} > 0$ shall be fulfilled.

Figure 8:
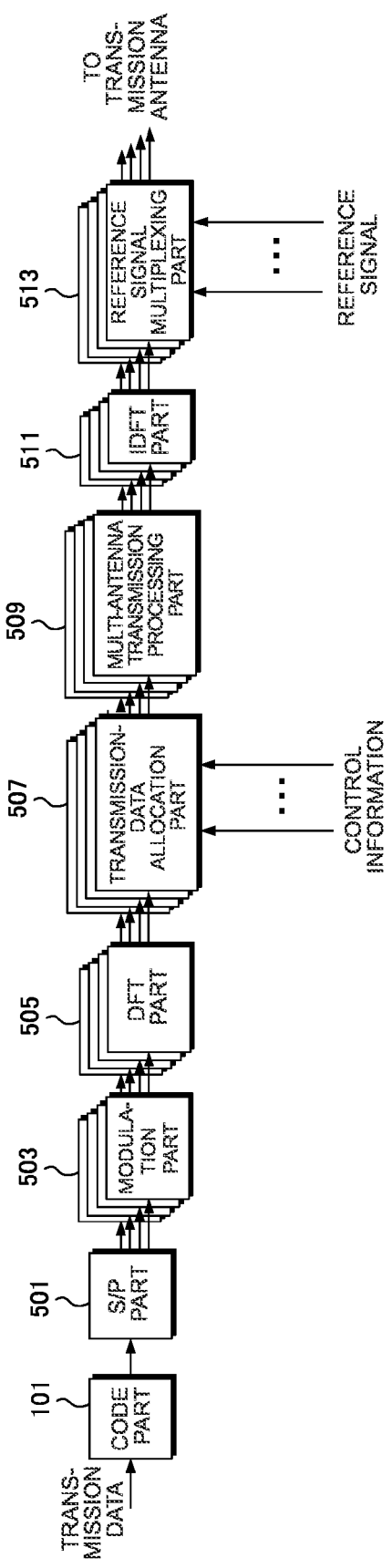
FIG. 8 is a block diagram illustrating an example of a mobile station apparatus that is a transmission apparatus according to the forth embodiment of the present invention (applying MIMO).

FIG. 8 is a block diagram illustrating an example of the mobile station apparatus that is a transmission apparatus according to the forth embodiment of the present invention (applying MIMO). A case where the MIMO is applied is described using FIG. 8. In the MIMO, the code bit is input into an S/P part, and serial parallel conversion is performed in the S/P part. A different signal in which the serial parallel conversion has been carried out is input to each modulation part 503 of each antenna, and transmission processing is performed thereto. In a multi-antenna transmission processing part 509 in the case of the MIMO, transmission weighting is applied for every antenna for enhancing detection accuracy of a spatial-multiplexed signal in the receiving side.

In the base station apparatus illustrated in FIG. 7, the reference signal is separated by the reception processing part 401 from the signal received by each receiving antenna, and the channel of each antenna is estimated. On the other hand, MIMO separation from the signal from which the reference signal has been separated is performed by a signal separation part 403, and the reception power is estimated by the reception power estimation part 202.

When the MIMO is applied, because of taking channels of all antenna used for transmission into consideration at the time of allocation of resource blocks, the frequency-selective diversity effect is decreased in comparison with the case where the number of the transmission antenna is one.

Therefore, the frequency-selective diversity effect at the time of the MIMO application may be made to be as a formula 10.

[Formula 10]

$$X_{i\_MIMO} = X_i - N_{MIMOANT} \quad (10)$$

Where, $X_i$ is made to be the frequency-selective diversity effect when the number of resource blocks constituting the cluster is made to be i. MIMOANT is a number of the antenna used in the MIMO, and $N_{MIMOANT}$ indicates a portion corresponding to deterioration of the frequency-selective diversity effect due to the number of the transmission antenna. In addition, $X_{i\_MIMO} > 0$ shall be fulfilled.

When the number of the transmission antennas is four or more, and the MIMO is applied using two transmission antennas, and the transmission diversity is applied using remaining two, a formula such as a formula 11 may be used.

[Formula 11]

$$X_{i\_MIMOT \times D} = X_i - N_{MIMOANT} - N_{T \times DANT} \quad (11)$$

In the case of using a plurality of transmission antennas, by applying any of the formula 9, formula 10 or formula II in place of $X_i$ to the closed loop TPC and open loop TPC of the previous embodiment, the transmission power control in consideration of the number of the antennas which the mobile station apparatus uses becomes possible. In addition, in the present embodiment, although the description by four transmission antennas has been performed, even transmission antennas of other than four are applicable. In the present embodiment, the number of the transmission antenna is reflected to the frequency-selective diversity effect, and the number of the receiving antenna, however, is also applicable similarly.

By applying the present embodiment, the open loop TPC and closed loop TPC in consideration of the switching of the access method, the number of resource blocks constituting the cluster, the number of divisions of the spectrum and the number of resource blocks which the mobile station apparatus uses, becomes possible. Therefore, it can be avoided that the transmission power is lacking, or the data transmission is carried out with an excessive transmission power, at the time of switching of the access method or the like.

DESCRIPTION OF SYMBOLS

101 CODE PART
102,503 MODULATION PART
103,505 DFT PART
104,301,507 TRANSMISSION-DATA ARRANGEMENT PART
105,305,511 IDFT PART
106,307,513 REFERENCE SIGNAL MULTIPLEXING PART
201,401 RECEPTION PROCESSING PART
202 RECEPTION POWER ESTIMATION PART
203 TPC CONTROL INFORMATION GENERATION PART
204,405 CHANNEL ESTIMATION PART
205 BAND ALLOCATION DECISION PART
206 CONTROL INFORMATION GENERATION PART
303,509 MULTI-ANTENNA TRANSMISSION PROCESSING PART
403 SIGNAL SEPARATION PART
501 S/P PART

The invention claimed is:

1. A wireless communication system comprising:
a control apparatus; and
a communication terminal apparatus, wherein
the communication terminal apparatus is configured to:
receive, from the control apparatus, control information indicating an access method for transmitting data, wherein the control information is information indicating one of a first access method and a second access method, wherein the first access method allocates a plurality of subcarriers continuously to form a single cluster of subcarriers and the second access method non-continuously allocates the plurality of subcarriers in at least a first cluster and a second cluster, wherein the first cluster includes a first portion of the plurality of subcarriers continuously allocated to form the first cluster and the second cluster includes a second portion of the plurality of subcarriers continuously allocated to form the second cluster;
modify a transmission power for transmitting the data by using a value, wherein the value is calculated by dividing the first number of resource blocks which the communication terminal apparatus uses for transmitting the data by the second number of resource blocks which the control apparatus can allocate, wherein the transmission power is modified so that the transmission power decreases in case in which the first number of resource blocks is decreased, if the second number of resource blocks is a fixed value; and transmit the data using the transmission power modified to the control apparatus, and the control apparatus is configured to:

receive the data from the communication terminal apparatus.

2. A communication terminal apparatus comprising:

a receive part configured to receive, from a control apparatus, control information indicating an access method for transmitting data, wherein the control information is information indicating one of a first access method and a second access method, wherein the first access method allocates a plurality of subcarriers continuously to form a single cluster of subcarriers and the second access method non-continuously allocates the plurality of subcarriers in at least a first cluster and a second cluster, wherein the first cluster includes a first portion of the plurality of subcarriers continuously allocated to form the first cluster and the second cluster includes a second portion of the plurality of subcarriers continuously allocated to form the second cluster;

a control part configured to modify a transmission power for transmitting the data by using a value, wherein the value is calculated by dividing a first number of resource blocks which the communication terminal apparatus uses for transmitting the data by a second number of resource blocks which the control apparatus can allocate, wherein the transmission power is modified so that the transmission power decreases in case in which the first number of resource blocks is decreased, if the second number of resource blocks is a fixed value; and a transmit part configured to transmit the data using the transmission power modified to the control apparatus.

transmitting the data using the transmission power modified to the control apparatus.

3. The communication terminal apparatus according to claim 2, wherein the control part is configured to modify the transmission power by performing open loop TPC (Transmit Power Control).

4. A non-transitory computer-readable medium having instructions stored thereon, such that when the instructions are read and executed by a processor, the processor is configured to perform the steps of:

receiving, from a control apparatus, control information indicating an access method for transmitting data, wherein the control information is information indicating one of a first access method and a second access method, wherein the first access method allocates a plurality of subcarriers continuously to form a single cluster of subcarriers and the second access method non-continuously allocates the plurality of subcarriers in at least a first cluster and a second cluster, wherein the first cluster includes a first portion of the plurality of subcarriers continuously allocated to form the first cluster and the second cluster includes a second portion of the plurality of subcarriers continuously allocated to form the second cluster;

modifying a transmission power for transmitting the data by using a value, wherein the value is calculated by dividing a first number of resource blocks which the communication terminal apparatus uses for transmitting the data by a second number of resource blocks which the control apparatus can allocate, wherein the transmission power is modified so that the transmission power decreases in case in which the first number of resource blocks is decreased, if the second number of resource blocks is a fixed value; and transmitting the data using the transmission power modified to the control apparatus.

5. A modifying method of a transmission power for transmitting data comprising:

receiving, from a control apparatus, control information indicating an access method for transmitting the data, wherein the control information is information indicating one of a first access method and a second access method, wherein the first access method allocates a plurality of subcarriers continuously to form a single cluster of subcarriers and the second access method non-continuously allocates the plurality of subcarriers in at least a first cluster and a second cluster, wherein the first cluster includes a first portion of the plurality of subcarriers continuously allocated to form the first cluster and the second cluster includes a second portion of the plurality of subcarriers continuously allocated to form the second cluster;

modifying the transmission power for transmitting the data by using a value, wherein the value is calculated by dividing the first number of resource blocks which a communication terminal apparatus uses for transmitting the data by the second number of resource blocks which the control apparatus can allocate, wherein the transmission power is modified so that the transmission power decreases in case in which the first number of resource blocks is decreased, if the second number of resource blocks is a fixed value; and transmitting the data using the transmission power modified to the control apparatus.

* * * * *